US010227186B2

(12) United States Patent
De Jager et al.

(10) Patent No.: US 10,227,186 B2
(45) Date of Patent: Mar. 12, 2019

(54) METHOD OF, A CONTROL SYSTEM, A DEVICE, A SENSOR AND A COMPUTER PROGRAM PRODUCT FOR CONTROLLING TRANSPORT OF FIBROUS MATERIAL IN A TRANSPORT LINE OF A PNEUMATIC CONVEYING SYSTEM

(71) Applicant: J.O.A. TECHNOLOGY BEHEER B.V., Delft (NL)

(72) Inventors: Gerard De Jager, Delft (NL); Marinus Adrianus Tukker, Delft (NL)

(73) Assignee: J.O.A. TECHNOLOGY BEHEER B.V., Delft (NL)

( * ) Notice: Subject to any disclaimer, the term of this patent is extended or adjusted under 35 U.S.C. 154(b) by 0 days.

(21) Appl. No.: 14/421,986

(22) PCT Filed: Aug. 16, 2013

(86) PCT No.: PCT/NL2013/050601
§ 371 (c)(1),
(2) Date: Feb. 16, 2015

(87) PCT Pub. No.: WO2014/027890
PCT Pub. Date: Feb. 20, 2014

(65) Prior Publication Data
US 2015/0232288 A1 Aug. 20, 2015

(30) Foreign Application Priority Data
Aug. 17, 2012 (NL) ...................................... 1039764

(51) Int. Cl.
*B65G 53/66* (2006.01)
*B65G 53/16* (2006.01)
*A24C 5/39* (2006.01)

(52) U.S. Cl.
CPC ................ *B65G 53/66* (2013.01); *A24C 5/39* (2013.01); *B65G 53/16* (2013.01)

(58) Field of Classification Search
CPC ............................... A24C 5/392; B65G 53/66
(Continued)

(56) References Cited

U.S. PATENT DOCUMENTS 3,580,644 A * 5/1971 Ballard, Jr. ............ A24C 5/392
131/110
3,822,582 A * 7/1974 Etkin ..................... G01N 15/06
73/28.01

(Continued)

FOREIGN PATENT DOCUMENTS

AU        629083      9/1992
DE      10332869      2/2005
EP       1840055     10/2007

OTHER PUBLICATIONS

PCT International Search Report dated Oct. 9, 2013 for PCT/NL2013/050601 filed on Aug. 16, 2013 in the name of J.O.A. Technology Beheer B.V.
(Continued)

*Primary Examiner* — Joseph A Dillon, Jr.
(74) *Attorney, Agent, or Firm* — Steinfl + Bruno LLP (57) ABSTRACT

A method of and control system for controlling transport of fibrous material travelling in dune or dune and layer flow mode conveyed by a pneumatic fluid flow through a transport line of a pneumatic conveying system, such as a cut tobacco conveying system in a device for feeding cut tobacco to a tobacco processing device. The transport velocity of a dune or layer and the velocity of pneumatic fluid passing the dune or layer in the transport line are determined. A difference between the determined dune or layer transport velocity and the determined passing fluid velocity is controlled by controlling the pneumatic fluid flow in the
(Continued)

transport line. An optical sensor and a computer program product for use with the method and system are provided.

12 Claims, 4 Drawing Sheets

(58) Field of Classification Search
 USPC .......................................................... 406/12
 See application file for complete search history.

(56) References Cited

U.S. PATENT DOCUMENTS

| | | | | |
|---|---|---|---|---|
| 4,220,164 | A * | 9/1980 | Lorenzen ................. | A24C 5/34 131/109.1 |
| 4,459,999 | A * | 7/1984 | Brackmann ............ | A24C 5/392 131/109.1 |
| 4,515,503 | A * | 5/1985 | Snowdon ............. | B65G 53/525 406/11 |
| 4,598,593 | A * | 7/1986 | Sheen ..................... | G01F 1/667 73/861.04 |
| 4,685,476 | A * | 8/1987 | Hagemann ............. | A24C 5/392 131/108 |
| 4,747,732 | A * | 5/1988 | Hanrot .................. | B65G 53/16 204/245 |
| 4,802,497 | A * | 2/1989 | Hrboticky .............. | A24C 5/392 131/108 |
| 4,932,423 | A * | 6/1990 | Lauenstein ............ | A24C 5/392 131/108 |
| 4,941,778 | A * | 7/1990 | Lehmann .............. | B05B 7/1404 250/356.1 |
| 5,252,007 | A * | 10/1993 | Klinzing ................ | B65G 53/66 406/14 |
| 5,447,550 | A * | 9/1995 | Leal-Cantu ............. | C21B 13/00 266/83 |
| 5,584,612 | A * | 12/1996 | Nolan .................... | B65G 53/66 406/11 |
| 5,806,531 | A * | 9/1998 | Diehl ..................... | A24C 5/392 131/108 |
| 6,106,202 | A * | 8/2000 | Nolan ................... | B65G 53/521 406/10 |
| 6,287,056 | B1 * | 9/2001 | Szikszay ................ | B65G 53/12 406/127 |
| 6,447,215 | B1 * | 9/2002 | Wellmar ................ | B65G 53/66 406/11 |
| 7,114,889 | B2 * | 10/2006 | Kanou ................... | B65G 53/66 406/14 |
| 7,152,003 | B2 * | 12/2006 | Loose .................... | G01F 1/666 702/189 |
| 7,249,525 | B1 * | 7/2007 | Engel .................... | G01F 1/7082 73/861.44 |
| 7,253,742 | B2 * | 8/2007 | Davis .................... | G01F 1/7082 340/606 |
| 7,503,227 | B2 * | 3/2009 | Davis ........................ | G01F 1/66 73/861.42 |
| 7,623,976 | B2 * | 11/2009 | Gysling ................. | G01F 1/363 702/100 |
| 7,725,270 | B2 * | 5/2010 | Davis ...................... | G01F 1/666 702/45 |
| 7,850,047 | B2 * | 12/2010 | Boroch .................. | B65G 53/16 222/181.2 |
| 7,882,750 | B2 * | 2/2011 | Davis .................... | G01F 1/7082 73/861.18 |
| 8,336,393 | B2 * | 12/2012 | Davis .................... | G01F 1/7082 73/861.18 |
| 8,504,310 | B2 * | 8/2013 | Landphair .............. | A01C 7/081 702/45 |
| 8,858,123 | B2 * | 10/2014 | Schmit ...................... | F23K 3/02 110/105 |
| 9,181,044 | B1 * | 11/2015 | Baker .................. | B65G 53/525 |
| 2002/0114672 | A1 * | 8/2002 | Isozaki .................. | B65G 53/66 406/11 |
| 2003/0154036 | A1 * | 8/2003 | Gysling ................. | G01F 1/666 702/25 |
| 2005/0005711 | A1 * | 1/2005 | Gysling .................. | G01F 1/363 73/861.08 |
| 2005/0011283 | A1 * | 1/2005 | Gysling .................... | G01F 1/74 73/861.44 |
| 2005/0011284 | A1 * | 1/2005 | Gysling .................... | G01F 1/74 73/861.44 |
| 2005/0012935 | A1 * | 1/2005 | Kersey ................. | G01B 11/161 356/519 |
| 2005/0125169 | A1 * | 6/2005 | Loose ................... | G01F 1/3254 702/45 |
| 2005/0171710 | A1 * | 8/2005 | Gysling ................ | G01F 1/7084 702/54 |
| 2006/0212231 | A1 * | 9/2006 | Bailey ..................... | G01F 1/666 702/45 |
| 2007/0038391 | A1 * | 2/2007 | Gysling .................... | G01F 1/74 702/45 |
| 2007/0118304 | A1 * | 5/2007 | Loose .................... | G01F 1/666 702/50 |
| 2008/0022782 | A1 * | 1/2008 | Gysling ................. | G01F 1/666 73/861.27 |
| 2010/0021248 | A1 * | 1/2010 | Aoki .................... | B65G 53/525 406/31 |
| 2011/0035163 | A1 * | 2/2011 | Landphair .............. | A01C 7/081 702/45 |
| 2011/0232547 | A1 * | 9/2011 | Schmit ...................... | F23K 3/02 110/263 |
| 2011/0268510 | A1 * | 11/2011 | Thorn .................... | B65G 53/66 406/30 |
| 2014/0284197 | A1 * | 9/2014 | Chalabi .................. | C10B 49/08 201/1 |
| 2016/0280473 | A1 * | 9/2016 | Veselov ................ | B65G 53/24 |
| 2017/0355534 | A1 * | 12/2017 | Hunt ...................... | B65G 53/16 |

OTHER PUBLICATIONS

PCT Written Opinion dated Oct. 9, 2013 for PCT/NL2013/050601 filed on Aug. 16, 2013 in the name of J.O.A. Technology Beheer B.V.

* cited by examiner

METHOD OF, A CONTROL SYSTEM, A DEVICE, A SENSOR AND A COMPUTER PROGRAM PRODUCT FOR CONTROLLING TRANSPORT OF FIBROUS MATERIAL IN A TRANSPORT LINE OF A PNEUMATIC CONVEYING SYSTEM

CROSS REFERENCE TO RELATED APPLICATIONS

The present application is the US national stage of International Patent Application PCT/NL2013/050601 filed internationally on Aug. 16, 2013 which, in turn, claims priority to Dutch Patent Application No. 1039764 filed on Aug. 17, 2012.

TECHNICAL FIELD

The present invention relates generally to pneumatic conveying and, more specifically, to processor controlled pneumatic conveying of fibrous material in dune or dune and layer flow mode through a transport line of a pneumatic conveying system.

BACKGROUND OF THE INVENTION

Pneumatic conveying of various materials or products by a pneumatic fluid through transport lines or transport pipes of a pneumatic conveying or transport system is widely used. Generally, the pneumatic fluid is a gas and in most cases the fluid is air.

Pneumatic conveying systems for the transport of fibrous material, for example, can be categorized into various modes of operation. A first mode of operation comprises continuous feeding, or at least batch type feeding, wherein it is an object to maintain a continuous flow of material through a transport line, at least for the amount of the batch of material to be transported. A second mode of operation is a demand driven start-stop process, by which the fibrous material is conveyed through the transport line in one of suspension flow, by which the fibres are conveyed apart from each other, by separately spaced dunes of material or as a substantially continuous layer of material comprising separately spaced dunes, also called dune and layer flow.

Both modes may suffer from plugging, in that the material or product in the transport line clogs, such that transport through the transport line may come to a complete standstill, or at least in that the conveying speed of the material is significantly reduced. Plugging can be avoided by decreasing the amount of material compared to the amount of pneumatic fluid in the transport line. However, if the ratio of the amount of material and the amount of air becomes too low, the effective conveying capacity of the conveying system decreases.

The business case in modern pneumatic conveying systems is in general to operate the system at an optimum with respect to the consumed or added fluid, such as air, and the amount of material transported in a given time period, while avoiding plugging and damaging of the material to be transported, among others as a result of a too high transport speed or transport velocity of the material in the transport line. Reducing damaging of the transport line and other appliances of the conveying system, such as valves, speed and pressure sensors, couplings and the like should, of course, also be taken into account when setting control parameters of the conveying system.

Operation of a pneumatic conveying system in start-stop mode, such as with the conveying of fibrous material like cut tobacco in suspension flow in a device for feeding cut tobacco to a tobacco processing device, such as a cigarette maker, in particular introduces a huge product degradation risk as each tobacco fibre is separately exposed to mechanical stresses during transport. On the other hand, the overall degradation risk of the tobacco fibres in dune or dune and layer flow conveying is reduced, as the fibres inside a dune or layer as such encounter less degradation.

Solutions provided to tobacco factories today are generally based on constant pressure conveying, which leads to uncontrolled velocity peaks due to variation in product loading.

SUMMARY

It is an object of the present invention to provide an improved and reliable control method and control equipment for controlling transport of fibrous material travelling in dune flow mode or dune and layer flow mode through a transport line of a pneumatic conveying system.

It is a further object of the present invention to provide a device for feeding cut tobacco to a tobacco processing device, such as a cigarette maker, comprising a pneumatic conveying system controlled by the improved control method and equipment.

In a first aspect, there is provided an improved method of controlling transport of fibrous material travelling in dune or dune and layer flow mode conveyed by a pneumatic fluid flow through a transport line of a pneumatic conveying system, the method comprising:

determining transport velocity of a dune and/or layer in the transport line;

determining velocity of pneumatic fluid passing a dune and/or layer in the transport line, and controlling a difference between the determined dune or layer transport velocity and the determined passing fluid velocity by controlling the pneumatic fluid flow in the transport line.

The improved control method is based on the insight that degradation of the material in the transport line is in particular at risk when the transport velocity of a dune or layer of material differs to a larger extent from the velocity of the conveying fluid. That is, when the velocity of the fluid passing a dune or layer of material in the transport line is too high with respect to the transport velocity of the dune or layer of fibrous material. The latter may result in so-called rolling dunes by which high mechanical stresses, in particular shearing stresses, are exerted at the fibres of the material. In particular cut tobacco is very prone to damaging caused by a too large difference between the dune or layer transport velocity and the passing fluid velocity.

Accordingly, by controlling the pneumatic fluid flow in the transport line to keep this difference within a certain range or within set thresholds, damage of the fibrous material in the transport line can be effectively avoided or at least as much as possible reduced, as the dunes in this approach will gently slide through the transport line and essentially keep their shape throughout the entire transport.

It has been found that for control purposes, the difference is preferably calculated as a slip ratio of the determined dune or layer transport velocity and the determined passing fluid velocity.

In an embodiment of the improved method, wherein the pneumatic fluid flow in the transport line is controlled in a start-stop mode, at the start of the fluid flow the slip ratio is controlled essentially at a set first threshold, wherein during stable transport of the fibrous material the slip ratio is controlled between essentially the first threshold and a set second threshold above the first threshold, preferably as close as possible at the second threshold, and wherein at stopping of the fluid flow the slip ratio is controlled to be essentially at the second threshold.

By this type of control, a preferred stable dune or dune and layer flow of fibrous material is relatively quickly reached, thereby controlling damage of the fibrous material during the start mode. At stopping the flow, the amount of pneumatic fluid is efficiently reduced to a level sufficient for the dunes or layer to be delivered, thereby avoiding unnecessary consumption of expensive pneumatic fluid.

For the transport of cut tobacco, for example, the first slip ratio threshold is set at a value of essentially 0.8 and the second slip ratio threshold is set at value of essentially 0.9. More preferred, the first threshold is set at a value of essentially 0.7 and the second threshold is set at a value of essentially 0.8 or 0.9. It will be appreciated that in stable conveying operation the slip ratio will not be above the value 1. A slip ratio of value 1 or essentially 1 refers to dune flow or dune and layer flow substantially extending over the entire cross-section of a transport line, also called a plug. The term essentially as used in the present description and claims in respect of the slip ratio expresses that the controlled slip ratio has a value of or near a set threshold, for example within a ±5% difference from such threshold.

A further key parameter in the material transport is the actual pneumatic fluid velocity in the transport line. A too low fluid velocity will result in plugging, whereas a too high fluid velocity, which equals a too low material or product loading, will result in material degradation.

In a further embodiment of the improved method, the difference, i.e. the slip ratio, is controlled dependent on controlling the pneumatic fluid flow to maintain a set dune or dune and layer transport velocity in the transport line. In practice, the set dune transport velocity will be kept at a minimum speed thereby avoiding as much as possible damage to the material or product and the pneumatic conveying system as such and, of course, such to avoid plugging.

In a further embodiment of the improved method a profile or shape of a dune and/or layer of fibrous material in the transport line is determined and the volume of this dune or layer is calculated from the determined profile or shape. From this volume and the type of fibrous material and its physical properties, the amount of transported material by a dune or layer can be determined.

In another embodiment of the improved method, the dune profile or shape is determined by measuring dimensions of the dune or dune and layer of fibrous material in the transport line transverse to its transport direction, in particular by measuring dune or layer height. In another embodiment, the dune or layer profile or shape and dune or layer material packing or filling density are determined by analysing images obtained by at least one digital camera, i.e. a so-called high-speed digital camera, arranged with the transport line for taking images of the dune or layer either in the transport direction and/or transverse to the transport direction of the dune or layer.

In an embodiment of the improved method, the pneumatic fluid flow at material introduction or material pick-up in the transport line is controlled to obtain a set dune and/or layer volume and/or a set dune and/or layer material packing or filling density in the transport line, for example a particular dune shape and dune height, at a set dune or layer transport velocity and/or mass flow rate. In this manner the ratio of the amount of material transported, for example expressed by its weight in kg, and the amount of air, likewise expressed in kg, also called loading or loading ratio, for obtaining the set material transport velocity and/or mass flow rate, can be optimized taking into account an amount of material to be delivered in a certain time period. By advance balancing calculations, a required pick-up pressure and false air injection for introducing cut-tobacco in the transport line at a material delivery unit may be used to support a desired loading or loading ratio of the cut-tobacco transport.

In an embodiment of the improved method, any of the dune or layer transport velocity, the passing fluid velocity and the dune or layer profile or shape is determined by at least one of an optical sensor and at least one high-speed digital camera arranged with the transport line. The difference between the determined dune and/or layer transport velocity and the determined passing fluid velocity, in an embodiment, is processed and controlled by a digital processor or processing device or computer arranged for controlling the pneumatic fluid flow in the transport.

It will be appreciated that the improved method may be practiced using other types of sensors or sensing devices, whether or not in connection with a suitably programmed digital processing device or computer for determining and controlling the material transport velocity and the passing air velocity, including commercially available pressure and speed measuring devices known to the skilled person, such as one or more of capacitively operating dielectric devices, electrical capacitance tomography (ECT) measurement devices, coriolis force meters, electrostatically operating devices, particle tagging, acoustic measurements, etc.

The improved method is in particular advantageous in the transport of cut tobacco, wherein the transport line is a feeding line of a tobacco processing device, such as a cigarette maker.

In a second aspect there is provided an improved control system arranged for controlling transport of fibrous material travelling in dune or dune and layer flow mode conveyed by a pneumatic fluid flow through a transport line of a pneumatic conveying system, the device comprising:

a device arranged for determining transport velocity of a dune and/or layer in the transport line;

a device arranged for determining velocity of pneumatic fluid passing a dune and/or layer in the transport line, and a digital processing device arranged for controlling a difference between the determined dune or layer transport velocity and the determined passing fluid velocity by controlling the pneumatic fluid flow in the transport line.

The pneumatic fluid flow may be controlled by controlling the amount of fluid introduced in the pneumatic conveying system from a source of pneumatic fluid operated by a fluid flow control unit and/or the amount of pneumatic fluid introduced in the transport line by controlling a fluid flow control unit arranged in the transport line, such as a pressure regulator-reducer valve, for example.

Likewise, the pneumatic fluid flow may be controlled by controlling the amount of vacuum or low-pressure introduced in the pneumatic conveying system by a vacuum device operated by a fluid flow control unit and/or the amount of vacuum or low-pressure introduced in the transport line by controlling a fluid flow control unit arranged in the transport line, such as a pressure regulator-reducer valve, for example.

In an embodiment of the improved control system, as explained above with reference to the description of the improved method, the digital processing device is arranged for calculating the difference as a slip ratio of the determined dune or layer transport velocity and the determined passing fluid velocity.

In a further embodiment of the improved control system the digital processing device is arranged for controlling the pneumatic fluid flow in the transport line in a start-stop mode, wherein at starting the fluid flow the slip ratio is essentially at a set first threshold, wherein during regular or stable transport of the fibrous material the slip ratio is between essentially the first threshold and a set second threshold above the first threshold, preferably as close as possible at the second threshold, and wherein at stopping the fluid flow the slip ratio is essentially at the second threshold.

In another embodiment of the improved control system, the digital processing device is arranged for determining a profile or shape of a dune and/or layer of fibrous material in the transport line and for calculating volume of the dune or layer from the determined profile or shape. The profile or shape may be determined, in an embodiment, in that the improved control system comprises a measuring device arranged for measuring dimensions of a dune or layer of fibrous material in the transport line transverse to its transport direction, in particular for measuring dune or layer height, and wherein the dune or layer profile or shape is determined by the digital processing device from the measured dimensions. At least one high-speed digital camera may be arranged with the transport line for determining the dune or layer profile or shape and/or dune or layer material packing or filling density, as explained above with reference to the improved method.

In an embodiment of the improved control system the digital processing device is arranged for controlling the pneumatic fluid flow at material introduction or pick-up of material in the transport line to obtain a set dune and/or layer volume and/or dune or layer material packing or filling density, such as a particular dune and/or layer shape and height, for example, at a set dune or layer transport velocity and/or mass flow rate.

In another embodiment of the improved control system, the digital processing device is arranged for controlling the difference, i.e. the slip ratio, dependent on controlling the pneumatic fluid flow to maintain a set dune or layer transport velocity in the transport line, such as a minimum transport velocity of the fibrous material in the transport line for which a stable operation without plugging is obtained, while minimizing material damage.

Direct controlled, fast responding servo driven valves provide for a fast response to control dune instabilities and to prevent plugging of the material in the transport pipe as adequate as possible, in accordance with the present invention.

In an embodiment the improved control system further comprises at least one of an optical sensor and at least one high-speed digital camera arranged with the transport line for determining any of the dune and/or layer material transport velocity, the passing fluid velocity and, the dune profile or shape.

In an embodiment, the at least one optical sensor comprises a plurality of optical gates, spaced apart in axial or transport direction of the transport line, and operatively arranged in a direction transverse to a transport direction of the fibrous material in the transport line, such that the fibrous material passes the gates in the transport line. The optical gates may comprise oppositely spaced photo-emitters, such as photodiodes or other sources of optical radiation, and photo-detectors, or other optical detecting means.

In a preferred embodiment of the improved control system, for use with a transport line in the form of a transport pipe, the optical gates are spaced apart in tangential direction of the transport pipe at its circumference. With such an arrangement, the profile or shape of a dune or layer transverse to its transport direction can be effectively determined.

For measuring the transport velocity of a dune or layer of fibrous material and/or the velocity of the fluid passing the dune or layer in the transport line, in another embodiment, groups of tangentially arranged optical gates are spaced apart in the transport direction in the transport line.

In a third aspect there is provided an optical sensor having a longitudinal passage for passing a pneumatic fluid and a material flow of a pneumatic conveying system, and a plurality of optical gates spaced apart in longitudinal direction of the passage and operatively arranged and spaced apart in a direction transverse to a flow direction or the longitudinal direction of the passage, for use in the improved control system disclosed above.

In a fourth aspect there is provided a device for feeding cut tobacco to a tobacco processing device, such as a cigarette maker, the device comprises a pneumatic conveying system comprising a feeding line, at least one source of pneumatic fluid, at least one cut-tobacco delivery unit, and a fluid flow control unit, the device being arranged for conveying the cut tobacco in a dune or dune and layer flow mode through the transport line from a tobacco delivery unit to the tobacco processing device, and comprising a control system according to any of the embodiments disclosed above for controlling the pneumatic fluid flow by operating the fluid flow control unit in accordance with the improved method.

In a fifth aspect the invention also provides a computer program product comprising a data storage device storing thereon computer program code data arranged for performing the method according to any of the embodiments explained above, when the program code data are loaded into a memory of a digital processing device and are executed by the digital processing device.

Advantageously, this computer program product may be comprised by any of a group of non-transitory data carrying devices including floppy discs, CD-ROMs, DVDs, tapes, memory stick devices, zip drives, flash memory cards, remote access devices, hard disks, semi-conductor memory devices, programmable semi-conductor memory devices, optical disks, magneto-optical data storage devices, ferro electric data storage devices and electrical and optical signal carriers or any other type of data carrier, having the program code data stored thereon.

The above-mentioned and other features and advantages of the invention are illustrated in the following description with reference to the enclosed drawings which are provided by way of illustration only and which are not limitative to the present invention.

DETAILED DESCRIPTION

Figure 1:
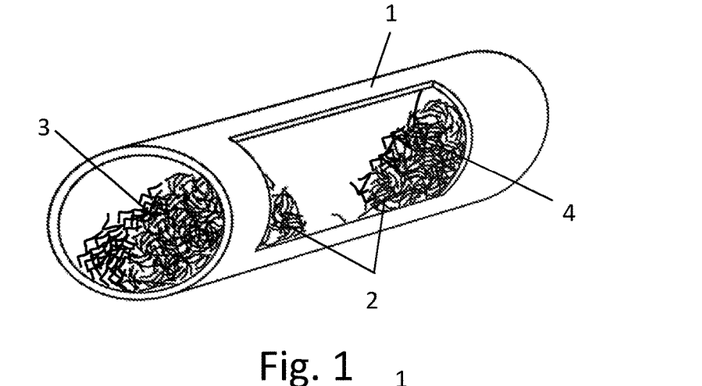
FIG. 1 shows, in a schematic, perspective and illustrative manner, a typical transport of fibrous material travelling in dune flow mode through a transport line of a pneumatic conveying system.

FIG. 1 shows, in a schematic, partly cut-away perspective view, part of a transport line 1, such as a circular cylindrical transport pipe, of a pneumatic conveying system in which fibrous material 2, such as cut tobacco, is transported in a typical dune flow mode, comprising dunes 3, 4. The dunes 3, 4 are conveyed by a pneumatic fluid, such as a gaseous medium like air.

Figure 2:
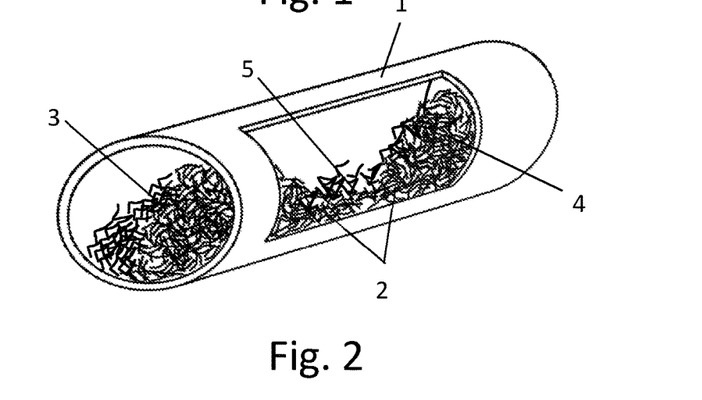
FIG. 2 shows, in a schematic, perspective and illustrative manner, a typical transport of fibrous material travelling in dune and layer flow mode through a transport line of a pneumatic conveying system.

FIG. 2 shows, in a same manner as FIG. 1, a typical dune and layer flow mode, having between the dunes 3, 4 a layer 5 of fibrous material, such as cut tobacco.

Figure 3:
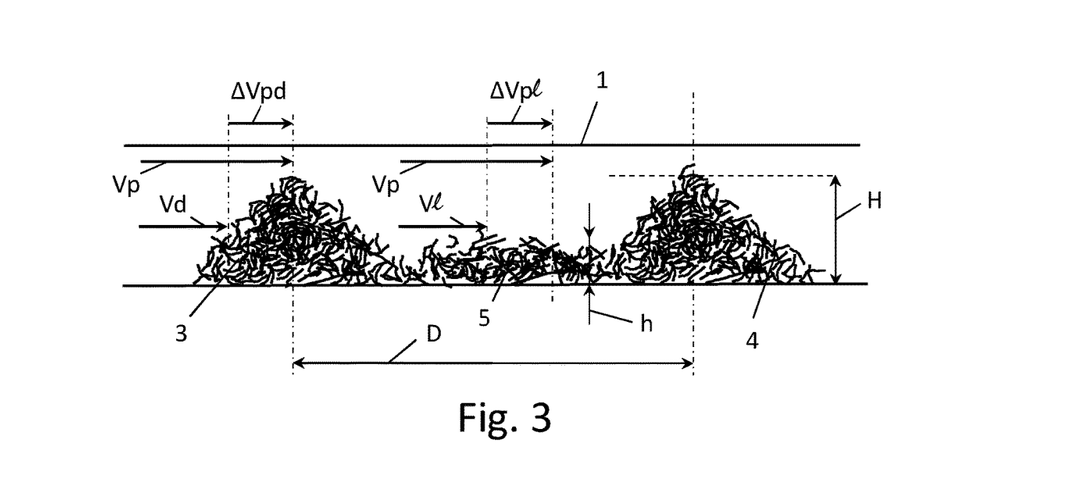
FIG. 3 shows, in a schematic and illustrative manner, parameters of the material transport in accordance with the invention.

FIG. 3 shows the dunes 3, 4 and layer 5 of fibrous material in a cross-sectional view of FIG. 2 in longitudinal direction of the transport line 1. Parameter H indicates the height of a dune 3, 4 measured in radial direction of the transport line 1. Parameter h indicates the height of the layer 5 measured in radial direction of the transport line 1. The distance between two subsequent dunes 3, 4 in the transport line 1 is indicated by a parameter D, also called the dune interval. It will be appreciated that the height H and distance D may vary from dune to dune and between dunes, respectively. Likewise, the height h of the layer 5 may vary between subsequent dunes. In the most optimum transport mode, however, for achieving an even and continuous as possible transport of the fibrous material 2, the various heights H, h and distances D differ slightly from dune to dune, this to obtain a constant and homogeneous delivery of an amount of fibrous material at a material processing device.

The transport velocity or speed of a dune, such as dune 3, in the transport line 1 is indicated by a vector Vd. The transport velocity or speed of a layer of material, such as layer 5, in the transport line 1 is indicated by a vector Vl. The velocity or speed of the pneumatic fluid passing the dune 3 in the transport pipe 1 is indicated by a vector Vp. The length of the vectors Vd, Vl and Vp is schematically indicated to be proportional to the respective velocity in an example of a material flow. The difference between the passing fluid velocity Vp and the dune transport velocity Vd is indicated by a vector ΔVpd. The difference between the passing fluid velocity Vp and the layer transport velocity Vl is indicated by a vector ΔVpl. As this figure is provided for illustrative purposes only, no specific numeric values are indicated. In a stable dune and layer transport mode, Vd and Vl will be essentially equal. The transport flow is presumed to be from left to right in the plane of the drawing.

The difference between the passing fluid velocity Vp and the dune transport velocity Vd or the layer transport velocity Vl may be calculated as velocity or speed difference, for example ΔVpd=Vp−Vd. However, preferably the difference is expressed as a ratio of the dune transport velocity and the passing fluid velocity, such as ΔVpd=Vd/Vp or ΔVpl=Vl/Vp, also called slip ratio.

Figure 4:
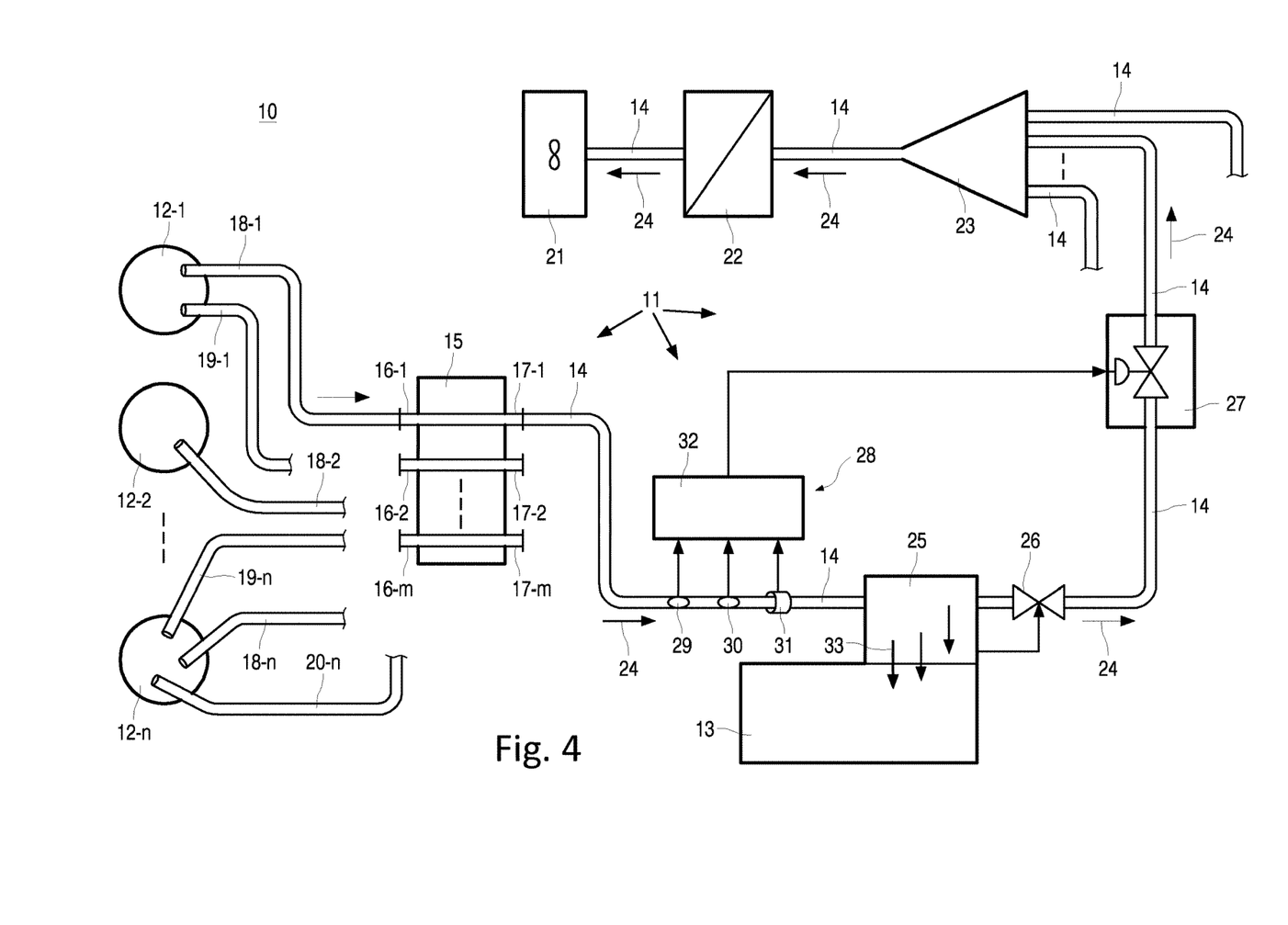
FIG. 4 shows, in a schematic and illustrative manner, a device for feeding cut tobacco to a tobacco processing device, such as a cigarette maker, comprising a pneumatic conveying system operated in accordance with the invention.

FIG. 4 shows, in a schematic and illustrative embodiment, an example of a device 10 for feeding cut tobacco from a delivery unit 12-1 to a tobacco processing device 13, such as a cigarette maker, by a pneumatic conveying system 11. The cut tobacco, or in general fibrous material, is transported in dune flow mode or dune and layer flow mode from the cut tobacco delivery unit 12-1 to the tobacco processing device 13 via an intermediate transport line 14, also called a feed line of the pneumatic conveying system 11.

The device 10 typically comprises a plurality of cut tobacco delivery units 12-1, 12-2, ..., 12-n (n≥1) each containing, for example, a different blend of cut-tobacco. For selecting a particular delivery unit 12-1, 12-2, ..., 12-n a so-called blend selector 15 is provided. The blend selector 15 comprises a plurality of inputs 16-1, 16-2, ..., 16-m (m≥1) that each connect to a respective output 17-1, 17-2, ..., 17-m of the blend selector. In the embodiment shown, delivery unit 12-1 connects via a feed line 18-1 to input 16-1 of the blend selector 15. At the corresponding output 17-1 of the blend selector 15 the feed line 14 to the cut-tobacco processing device 13 connects, such that cut-tobacco from the delivery unit 12-1 is introduced and transported to the cut-tobacco processing device 13.

For producing tobacco products by the tobacco processing device 13 having a different blend, a respective one of the other delivery units 12-2, ..., 12-n has to be connected, with its feed line 18-x (x=2, ..., n), to input 16-1 of the blend selector 15, of course by first disconnecting the feed line 18-1.

A particular delivery unit 12-1, 12-2, ..., 12-n may comprise several feed lines 19-x, 20-x, etc. (x=1, 2, ..., n) for connecting the respective delivery unit to a respective (other) input 16-1, 16-2, ..., 16-n of the blend selector 15, at each output 17-2, ..., 17-n of which, by a respective pneumatic conveying system, a further cut-tobacco processing device may connect.

In the embodiment shown, the pneumatic conveying system 11, downstream of the cut-tobacco processing device 13, comprises a unit 21, such as a fan or equivalent device for creating a low pressure or vacuum in the transport line 14. To prevent entrance of dust or other substances of cut-tobacco from the transport line 14 into the unit 21, a dust filter 22 is provided in front of the unit 21, when viewed in the material transport direction, schematically indicated by arrows 24.

In the embodiment shown, the unit 21 is operative for a plurality of cut-tobacco processing devices 13, via a plurality of pneumatic conveying systems 11, the transport lines 14 of which are collected by a line collector unit 23 which collects, for example, six transport lines 14.

Tobacco transport in the transport line 14 is operated according to a demand driven start-stop process. For providing an amount of tobacco for processing by the cut-tobacco processing device 13, a so-called air lock 25 is incorporated in the transport line 14 at the cut-tobacco processing device 13. Behind the air-lock 25, when viewed in the transport direction 24, a valve 26 is included in the transport line 14. This valve 26, also called maker valve, is operated by the cut-tobacco processing device 13, such as a cigarette maker. The maker valve 26 operates for closing and opening of the transport line 14, i.e. for stopping and starting the material transport there through.

For controlling the pneumatic fluid flow in the transport line 14, a fluid flow control unit 27, for example in the form of at least one flow control valve such as a servo motor driven pressure regulator-reducer, is incorporated in the transport line 14 between the maker valve 26 and the line collector unit 23. The fluid flow control unit 27 is operated by a control system 28.

Reference numerals 29, 30 and 31 indicate devices of the control system 28 for determining physical parameters, such as velocity or speed of the material and pneumatic fluid transport in the transport line 14 at a position in front of the cut-tobacco processing device 13, when viewed in the transport direction 24. The values measured by any of the devices 29, 30 and 31 are provided to a digital processing device or electronic processor or computer 32. The processing device 32 is suitably programmed for processing the input received from the devices 29, 30, 31 for controlling the material transport in the feeding line 14 by suitably operating the fluid flow control unit 27. Such to provide a material transport in dune flow mode or dune and layer flow mode in the transport line 14 from its introduction at the delivery unit 12-1 to the cut-tobacco processing device 13, for example.

Servo motor driven pressure regulator-reducer valves and velocity determining or measurement devices, as such, are known to the skilled person and commercially available. The latter may include direct velocity or speed measurement devices or indirect velocity or speed measurement devices such as pressure and pressure difference measurement devices measuring pressure of the pneumatic fluid at several positions in and along the transport line, from which the particular velocities can be determined. Examples of known material speed measurement devices are capacitively operating dielectric devices, electrical capacitance tomography (ECT) measurement devices, coriolis force meters, electrostatically operating devices, particle tagging, acoustic measurements, etc. Measurement data in both analogue and/or digital form may be processed.

As will be appreciated by those skilled in the art, a number of other control mechanisms may be provided at the pneumatic conveying system 11, such as valves for releasing pneumatic fluid from the material delivery unit 12, the transport line 14, safety valves, and the like (not shown). Direct controlled, fast responding servo drive valves provide for a fast response to control dune instabilities and to prevent plugging of the material in the transport line as adequate as possible.

In operation, the unit 21 is operative to create a low-pressure or vacuum in the transport line 14, such that cut-tobacco and air is introduced into the transport line 14, from the material delivery unit 12-1, and transported to the cut-tobacco processing device 13. By the air-lock 25 cut-tobacco from the transport line 14 is received and collected. Once the cut-tobacco processing device 13 requires an amount of cut-tobacco, it closes the maker valve 26 and the cut-tobacco 33 is released from the air-lock 25 and delivered to the cut-tobacco processing device 13, after which the maker valve 26 is opened again. The amount of cut-tobacco delivered and the flow mode of the fibrous material in the transport line 14 are typically achieved by controlling the pneumatic fluid in the transport line 14 from the control system 28 operating the flow control unit 27. By advance balancing calculations, a required pick-up pressure and false air injection for introducing cut-tobacco in the transport line 14 at a material delivery unit 12-1, 12-2, . . . , 12-n may be used to support a desired loading or loading ratio of the cut-tobacco transport.

In accordance with an embodiment of the invention, from measurement data provided by any or each of the devices 29, 30, 31 the digital processing device 32 determines the transport velocity Vd of a dune 3, 4 of fibrous material and/or the transport velocity Vl of a layer 5 of fibrous material, the velocity Vp of pneumatic fluid passing this dune and/or layer in the transport line 14 and calculates the difference ΔVpd between Vp and Vd and/or the difference ΔVpl between Vp and Vl.

The digital processing device 32 is suitably programmed to control the pneumatic fluid flow in the transport line 14 based on the calculated value ΔVpd and/or ΔVpl, whenever applicable, preferably calculated as a slip ratio. The pneumatic fluid flow in the transport line 14 is controlled by the digital processing device 32 by controlling the extend of the opening or closing of the flow control unit 27, such as a pressure regulator-reducer valve and, if applicable, the amount of pneumatic fluid introduced in the transport line 14 from the delivery unit 12-1.

Figure 5:
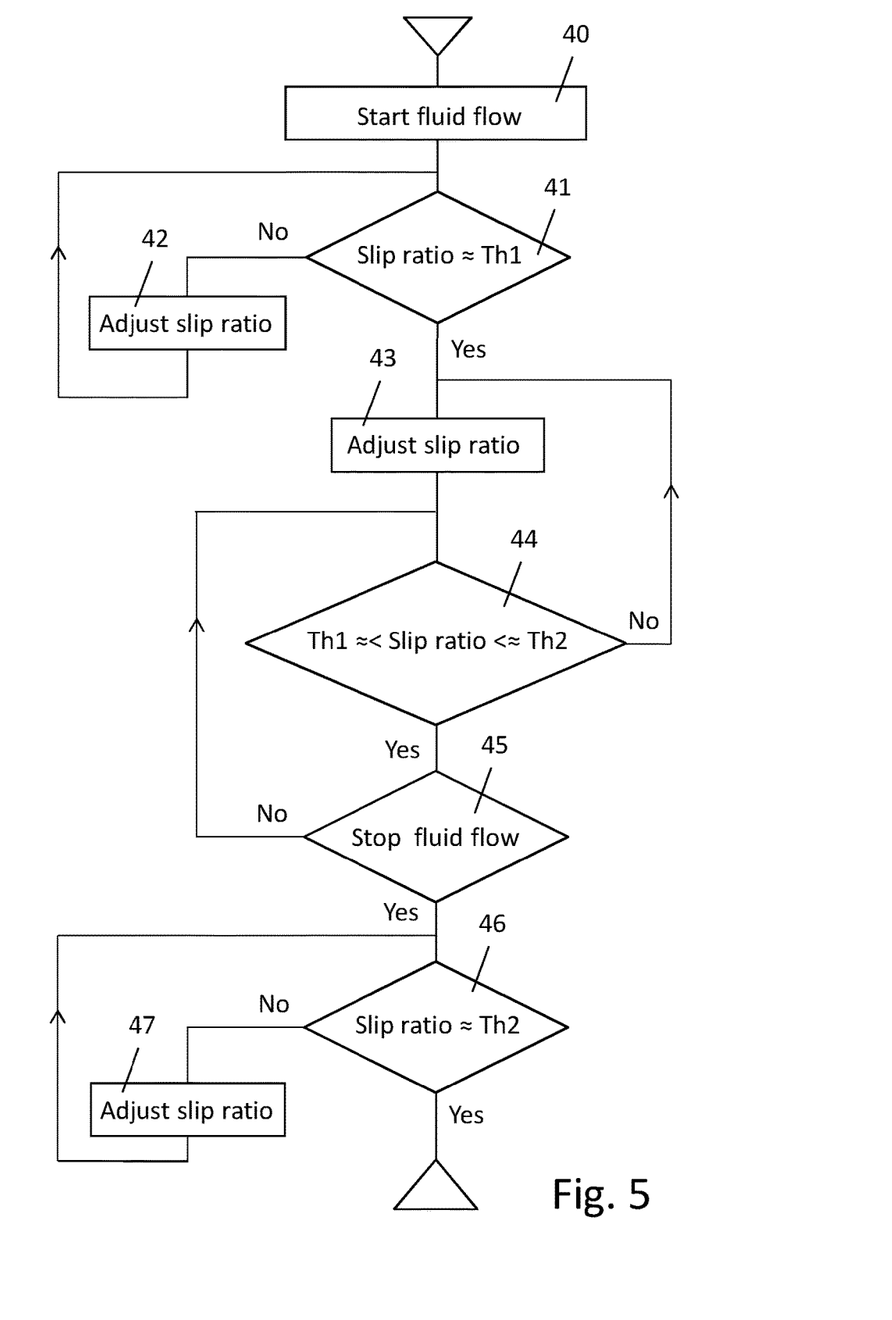
FIG. 5 shows a basic flow chart of an embodiment of the method according to the invention.

FIG. 5 shows in a very basic flow chart, an embodiment of the improved control method periodically operating in a start-stop mode. The forward direction in the flow chart is from the top to the bottom of the drawing. Backward steps are indicated by an arrow. It is assumed that the slip ratio is controlled.

With block 40 "Start fluid flow", the start of the pneumatic fluid flow is indicated, by suitably operating any or both of the fluid flow control units 17, 18, for example. If the slip ratio is essentially at a set first threshold Th1, "Slip ratio≈Th1", i.e. decision block 41 result "Yes", a stable dune or dune and layer material transport mode will be reached. If not, i.e. block 41 result "No", the slip ratio has to be adjusted, i.e. block 42 "Adjust slip ratio", by controlling the pneumatic fluid flow in the transport line 14 by controlling the flow control unit 27.

After a certain time period, which depends, inter alia, on the type of fibrous material to be transported, the physical properties of the pneumatic conveying system 11, such as the transport line length and its cross-section, the dune flow has been more or less built up such that the slip ratio may be adjusted to reduce as much as possible the risk of damage of the fibrous material in the transport line 14 and to increase the amount of material that is actually transported, i.e. to optimize the effective loading of the conveying system, also taking into account the amount of material to be delivered in a set time period, i.e. block 43 "Adjust slip ratio". The slip ratio is adjusted by optimizing the ratio between Vd and/or Vl and Vp by controlling the dune and/or layer shape and the loading of fibrous material from a material delivery unit 12-1.

In a stable transport mode, that is as long as the transport line 14 remains connected to the unit 21 causing a low-pressure or vacuum in the transport line 14 such that the material flow is not stopped, i.e. block 45 "Stop fluid flow", result "No", the slip ratio is controlled between essentially the first threshold Th1 and a set second threshold Th2 having a value above the first threshold Th1, and preferably as close as possible at the second threshold Th2, i.e. decision block 44 "Th1≈<slip ratio<≈Th2". Again by controlling the flow control unit 27.

Once the flow of material in the transport line 14 is to be stopped, i.e. block 45 result "Yes", the slip ratio is controlled to be essentially at the second threshold Th2, i.e. decision block 45 "Slip ratio≈Th2". If the slip ratio is too much below Th2, i.e. block 45 result "No", the slip ratio has to be adjusted, i.e. block 47 "Adjust slip ratio", by controlling the flow control unit 27. The flow of material in the transport line 14 can be stopped by suitably operating any or both of the unit 21 or the line collector 23, for example, when the slip ratio is essentially at the second threshold Th2, i.e. block 46 result "Yes".

In particular in the stable dune or dune and layer transport mode, the fibrous material is to be transported at a set transport velocity Vd and/or Vl, such that this transport velocity then forms a set point of the slip ratio control. For damage control purposes, the passing fluid velocity Vp may not be increased above a maximum value which, among others, depends on the material to be transported.

The measurements and calculations by the devices 29, 30, 31 and 32 may be carried out in real time or near real time.

For tobacco conveying in dune or dune and layer flow transport, for example, in practice transport pipes with a length in the range of 50-500 m are used, having an internal diameter in the range of 80-150 mm. Typical values of Vp are 9-23 m/s and of Vd or Vl are 6-21 m/s, respectively. A typical value for the distance D is about 3-6 m, while the base of a dune 3, 4 measured in length direction of the pipe is about 0.5-1.5 m long. A value of the first threshold Th1 is essentially 0.8 and a value of the second threshold is essentially 0.9. More particular, a typical value of the first threshold Th1 is essentially 0.7 and a typical value of the second threshold is essentially 0.8 or 0.9. It has been observed that at a slip ratio of essentially 0.5 dune flow is unstable and rolling dunes occur.

An important aspect of the material feeding process is to obtain an optimal loading of fibrous material, that is dune volume and/or dune packing or filling density and dune shape, related to the amount of fluid for conveying the material. To this end, the digital processing device 32 is arranged for controlling the pneumatic fluid flow in the transport line 14 to obtain a set dune or and/or layer volume, such as a particular dune shape and height or layer height, and/or material packing or filling density in a dune and/or layer, i.e. the amount of fibrous material in a dune or layer, for example.

The slip ratio may be controlled at a value essentially equal to 1 for obtaining a dune flow or a dune and layer flow substantially filling the entire cross-section of a transport line.

Figure 6:
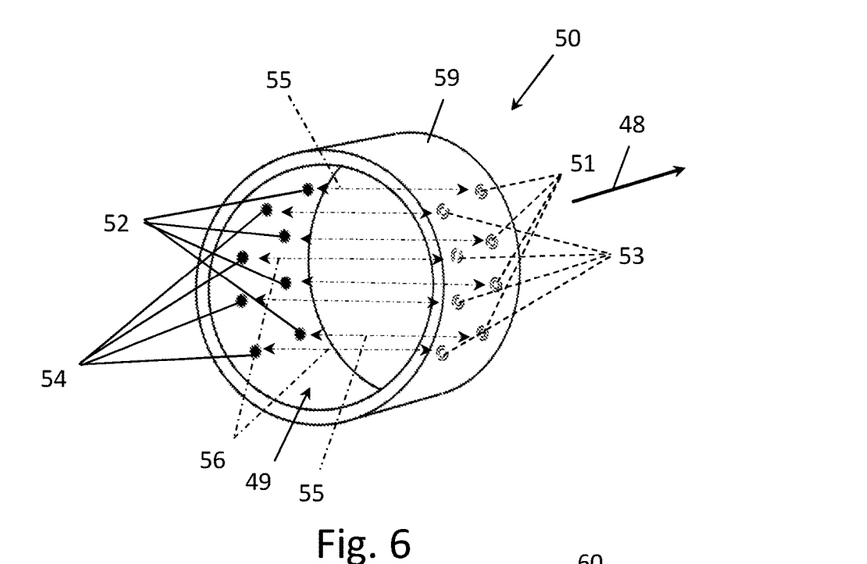
FIG. 6 shows, in a schematic, perspective and illustrative manner, an embodiment of an optical sensor in accordance with the invention.

FIG. 6 shows an optical sensor 50 in an embodiment of the invention, arranged for determining the dune transport velocity Vd and/or the layer transport velocity Vl and the passing fluid velocity Vp in a transport line of a pneumatic conveying system. The optical sensor 50 may replace the device 31 in FIG. 3, for example. FIG. 6 shows an embodiment of the optical sensor 50 having a longitudinal housing 59 with an internal circular cylindrical passage 49 for use with circular cylindrical transport lines. However, the optical sensor may be designed having other cross-sections. Although not shown, the optical sensor 50 may comprise flanges or the like for mounting same between transport lines or transport pipes of new and existing pneumatic conveying systems. The housing of the sensor 50 may be made of the same material as a transport line or transport pipe of a conveying system, such as from steel or stainless steel.

In the embodiment shown, the optical sensor 50 comprises a plurality of optical gates 55, 56, schematically indicated by dashed-dotted lines, arranged in the internal passage 49 of the sensor 50, spaced apart in longitudinal or axial direction of the housing 59, and operative in a direction transverse to the flow or transport direction of the passage 49 for passing a fluid and material flow, indicated by arrow 48. The optical gates 55, 56 are spaced apart in radial and axial direction of the passage 49 and comprise oppositely spaced photo-emitters 52, 54, such as light emitting diodes (LEDs) or other sources of emitting optical radiation, and photo-detectors 51, 53 or other optical detecting means. That is, an optical gate is formed by a pair of an oppositely spaced photo-emitter and photo-detector.

The photo-emitters of a first group of photo-emitters 52 are tangentially spaced apart over the circumference of the internal passage 49. The photo-detectors of a first group of photo-detectors 51 are likewise tangentially spaced apart distributed over the circumference of the inner passage 49, opposite the corresponding photo-emitters 52, such to form a group of optical gates 55 operative in radial direction of the passage 49.

Likewise, the photo-emitters of a second group of photo-emitters 54 are tangentially spaced apart over the circumference of the internal passage 49 and the photo-detectors of a second group of photo-detectors 53 are tangentially spaced apart distributed over the circumference of the inner passage 49, opposite the corresponding photo-emitters 52, such to form a group of optical gates 56 operative in radial direction of the passage 49.

The first 51, 52 and second 53, 54 groups are spaced apart in axial direction, i.e. in the transport direction, of the passage 49 of the longitudinal housing 59.

The profile or shape of a dune or layer of material and the distance D between adjacent dunes in the transport direction 48 can be effectively determined by a single group 51, 52 or 53, 54 of photo-emitters and photo-detectors. When a dune 3, 4 passes the optical gates 55, 56 the height H of the dune 3, 4, for example, is determined from the optical gate or gates 55, 56 at the top of the passage 49, seen in the plane of the drawing. That is, whether the optical transmission path, or line of sight, from a particular photo-emitter 51, 52 to an oppositely located photo-detector 53, 54 is or is not blocked by the dune 3, 4. While the dunes 3, 4 travel through the passage 49, the profile or shape in the transport direction 48 is determined from the respectively blocked/non-blocked optical gates 55, 56 during the passage of a dune 3, 4. The height h of layer 5 is generally determined from blocked/non-blocked optical gates 55, 56 at the bottom of the passage 49, viewed in the plane of the drawing.

The dune transport velocity Vd and the layer velocity Vl can be effectively determined from the time lapsed between passing, by a particular dune or layer of correspondingly, axially located optical gates 55, 56 and the distance between these gates measured in the transport direction 48. The fluid velocity Vp may be determined from material particles axially passing correspondingly located optical gates 55, 56 that are not blocked by a dune or layer.

It will be appreciated that for determining the dune profile or shape, for example, an optical sensor having a single group of optical gates 55 or 56 suffices.

Although the profile or shape of a dune 3, 4 or layer 5 transverse to the transport direction 48 can not be determined by the optical gates 55, 56, the volume of a dune 3, 4 and layer 5, within a certain accuracy, may be calculated already from the profile or shape measurements performed by the optical sensor 50.

Figure 7:
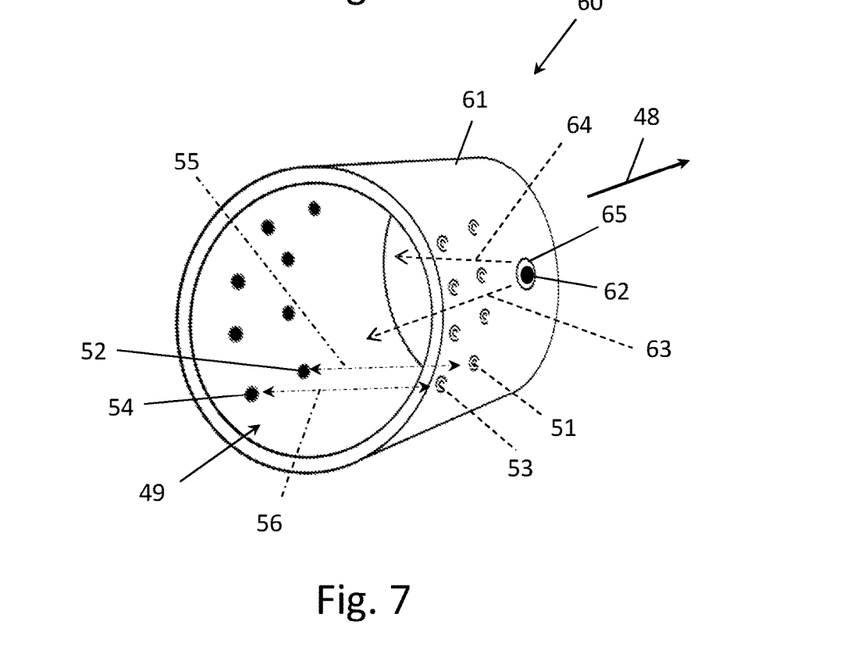
FIG. 7 shows, in a schematic, perspective and illustrative manner, an embodiment of a combined digital camera and optical sensor of FIG. 6.

A more accurate determination of the dune volume and dune material packing or filling density is provided by an embodiment of an optical sensor 60, schematically shown in FIG. 7, having a like construction as the optical sensor 50, with a housing 61 having a passage 49 for the transport of fluid and material. In addition to the optical gates 55, 56, formed by spaced apart pairs of photo-emitters and photo-detectors 51, 52 and 53, 54, respectively, at least one digital camera 62 is arranged to view material transport through the passage 49. The camera 62 is arranged to view the passage 49 in and transverse of the transport direction 48, schematically indicated by dashed arrows 63, 64. In the embodiment shown, the camera 62 views the passage from outside the housing 61 through a hole 65 in the wall of the housing 61. However, the camera 62 may also be mounted inside the housing 61, for example.

By analysing the images of the camera 62 by the digital processing device 32, in conjunction with the profile or shape measurements obtained from the optical gates 55, 56, the volume and material packing or filling density of a dune 3, 4 and/or layer 5 can be accurately determined by the digital processing device 32. From the physical properties of the fibrous material to be transported, the amount of material in a dune can be accurately calculated, as known to the skilled person. The result of this calculation is then used, by the digital processing device 32, to control any or all of the velocities Vd, Vl and Vp, i.e. the slip ratio calculated therefrom, for optimizing the loading of the conveying system, for example the ratio of the amount of material transported by a dune, for example expressed in kg, and the amount of consumed or added pneumatic fluid, also calculated in kg, i.e. the loading or loading ratio, whether or not dependent on a set velocity level, such as a minimum transport velocity and/or mass flow rate of the fibrous material in the transport line.

The at least one camera 62 is a so-called high-speed camera. A high-speed camera is a device used for recording images of fast moving objects. After recording, the images stored on a storage medium can be analysed. Present high-speed cameras are entirely electronic and can record typically over 1000 frames per second. In contrast, a normal motion picture camera records 24 frames per second, while television uses 25 frames/s. For the purpose of the invention, the at least one camera 62 may be arranged in a housing separate from the housing 61 of the optical gates 55, 56 for use in a conveying system.

In a practical embodiment, with the invention, for cut-tobacco transport in transport pipes having an internal diameter in the range of 80-150 mm, a very efficient loading of about 2-2.5 kg cut-tobacco per kg air has been achieved, with a typical air speed of 10-12 m/sec and a cut-tobacco speed of 8-9 m/sec.

Although not explicitly disclosed, it will be appreciated that pressure of the pneumatic fluid in the transport line may be determined to be evaluated by the improved method and improved control system. The improved method and control system may further be applied at several points in a same transport line, for example to calculate fluid leakage in the pneumatic conveying system.

The invention may be practiced otherwise than as specifically described herein, and the above mentioned embodiments and examples are merely intended as an illustration to the skilled reader.

The invention claimed is:

1. A control system arranged for controlling transport of fibrous material travelling in one of a dune and a dune and layer flow mode conveyed by a pneumatic fluid flow, not in turbulent flow, through a transport line of a pneumatic conveying system comprising a fluid flow control unit, said control system comprising:
   a device arranged for determining transport velocity of one of a dune and a dune and layer in said transport line;
   a device arranged for determining velocity of pneumatic fluid passing one of a dune and a dune and layer in said transport line, and
   a digital processing device arranged for controlling a difference between said determined transport velocity and said determined velocity of passing pneumatic fluid by controlling said fluid flow control unit in said transport line, wherein said digital processing device is arranged for calculating said difference as a slip ratio of said determined transport velocity and said determined velocity of passing pneumatic fluid.

2. A control system arranged for controlling transport of fibrous material travelling in one of a dune and a dune and layer flow mode conveyed by a pneumatic fluid flow, not in turbulent flow, through a transport line of a pneumatic conveying system comprising a fluid flow control unit, said control system comprising:
   a device arranged for determining transport velocity of one of a dune and a dune and layer in said transport line;
   a device arranged for determining velocity of pneumatic fluid passing one of a dune and a dune and layer in said transport line, and
   a digital processing device arranged for controlling a difference between said determined transport velocity and said determined velocity of passing pneumatic fluid by controlling said fluid flow control unit in said transport line, wherein said digital processing device is arranged for calculating said difference as a slip ratio of said determined transport velocity and said determined velocity of passing pneumatic fluid, said digital processing device is arranged for controlling said pneumatic fluid flow in said transport line in a start-stop mode, wherein at starting said pneumatic fluid flow said slip ratio is controlled essentially at a set first threshold, wherein during transport of said fibrous material said slip ratio is controlled between essentially said first threshold and a set second threshold above said first threshold, and wherein at stopping said fluid flow said slip ratio is essentially at said second threshold.

3. The control system according to claim 1, wherein said digital processing device is further arranged for determining a profile or shape of one of a dune and a dune and layer of fibrous material in said transport line and for calculating volume of said one of a dune and a dune and layer from said determined profile or shape.

4. The control system according to claim 1, further comprising a measuring device arranged for measuring dimensions of one of a dune and a dune and layer of fibrous material in said transport line transverse to its transport direction, and wherein a profile or shape of said one of a dune and a dune and layer is determined by said digital processing device from said measured dimensions.

5. The control system according to claim 1, wherein said digital processing device is further arranged for controlling said pneumatic fluid flow at material introduction in said transport line to obtain one of a set dune and a set dune and layer volume at a set transport velocity.

6. The control system according to claim 1, wherein said digital processing device is further arranged for controlling said difference dependent on controlling said pneumatic fluid flow to maintain a set transport velocity in said transport line.

7. The control system according to claim 1, wherein said digital processing device is further arranged for maintaining said transport velocity at a minimum transport velocity of said fibrous material in said transport line.

8. The control system according to claim 1, further comprising at least one of an optical sensor and at least one high-speed digital camera arranged with said transport line for determining one of said transport velocity, said velocity of passing pneumatic fluid and a profile or shape of one of a dune and a dune and layer.

9. A control system arranged for controlling transport of fibrous material travelling in one of a dune and a dune and layer flow mode conveyed by a pneumatic fluid flow, not in turbulent flow, through a transport line of a pneumatic conveying system comprising a fluid flow control unit, said control system comprising:
- a device arranged for determining transport velocity of one of a dune and a dune and layer in said transport line;
- a device arranged for determining velocity of pneumatic fluid passing one of a dune and a dune and layer in said transport line,
- a digital processing device arranged for controlling a difference between said determined transport velocity and said determined velocity of passing pneumatic fluid by controlling said fluid flow control unit in said transport line, and
- at least one optical sensor, wherein said at least one optical sensor comprises a plurality of optical gates, spaced apart in axial or transport direction of said transport line, and operatively arranged in a direction transverse to a transport direction of said fibrous material in said transport line, such that said fibrous material passes said gates in said transport line.

10. A control system arranged for controlling transport of fibrous material travelling in one of a dune and a dune and layer flow mode conveyed by a pneumatic fluid flow, not in turbulent flow, through a transport line of a pneumatic conveying system comprising a fluid flow control unit, said control system comprising:
- a device arranged for determining transport velocity of one of a dune and a dune and layer in said transport line;
- a device arranged for determining velocity of pneumatic fluid passing one of a dune and a dune and layer in said transport line,
- a digital processing device arranged for controlling a difference between said determined transport velocity and said determined velocity of passing pneumatic fluid by controlling said fluid flow control unit in said transport line, and
- at least one optical sensor, wherein said at least one optical sensor comprises a plurality of optical gates, spaced apart in axial or transport direction of said transport line, and operatively arranged in a direction transverse to a transport direction of said fibrous material in said transport line, such that said fibrous material passes said gates in said transport line, said transport line having the form of a transport pipe, wherein said optical gates are spaced apart in tangential direction of said transport pipe.

11. A control system arranged for controlling transport of fibrous material travelling in one of a dune and a dune and layer flow mode conveyed by a pneumatic fluid flow, not in turbulent flow, through a transport line of a pneumatic conveying system comprising a fluid flow control unit, said control system comprising:
- a device arranged for determining transport velocity of one of a dune and a dune and layer in said transport line;
- a device arranged for determining velocity of pneumatic fluid passing one of a dune and a dune and layer in said transport line,
- a digital processing device arranged for controlling a difference between said determined transport velocity and said determined velocity of passing pneumatic fluid by controlling said fluid flow control unit in said transport line, and
- at least one optical sensor, wherein said at least one optical sensor comprises a plurality of optical gates, spaced apart in axial or transport direction of said transport line, and operatively arranged in a direction transverse to a transport direction of said fibrous material in said transport line, such that said fibrous material passes said gates in said transport line, wherein groups of tangentially spaced apart arranged optical gates are spaced apart in said transport direction in said transport line.

12. The control system according to claim 1, comprising a measuring device arranged for measuring height of one of a dune and a dune and layer of fibrous material in said transport line transverse to its transport direction, and for determining a profile or shape of said one of a dune and a dune and layer from said measured height.

* * * * *